(12) United States Patent
Stoddard, Jr.

(10) Patent No.: US 9,713,950 B1
(45) Date of Patent: Jul. 25, 2017

(54) CONVERTIBLE SIDEWALL EXTENDER TO TRUCK BED COVER ASSEMBLY

(71) Applicant: David Stoddard, Jr., Apache Junction, AZ (US)

(72) Inventor: David Stoddard, Jr., Apache Junction, AZ (US)

( * ) Notice: Subject to any disclaimer, the term of this patent is extended or adjusted under 35 U.S.C. 154(b) by 0 days.

(21) Appl. No.: 15/079,657

(22) Filed: Mar. 24, 2016

(51) Int. Cl.
*B60J 7/16* (2006.01)
*B62D 33/03* (2006.01)

(52) U.S. Cl.
CPC ............ *B60J 7/1621* (2013.01); *B62D 33/03* (2013.01)

(58) Field of Classification Search
CPC ... B60J 7/14; B60J 7/141; B60J 7/1607; B60J 7/16; B60J 7/1614; B60J 7/1621; B62D 33/027; B60P 7/02
USPC ... 296/26.06, 100.06, 100.07, 100.1, 32, 36, 296/40, 100.09
See application file for complete search history.

(56) References Cited

U.S. PATENT DOCUMENTS

| | | | | |
|---|---|---|---|---|
| 2,997,330 A * | 8/1961 | Boultinghouse | ........... | B60R 9/00 296/10 |
| 3,069,199 A * | 12/1962 | Reardon | ............... | B60J 7/102 217/60 R |
| 3,765,717 A * | 10/1973 | Garvert | ................... | B60J 7/141 296/100.07 |
| 4,284,303 A * | 8/1981 | Hather | ...................... | B60P 3/42 16/261 |
| 4,531,775 A * | 7/1985 | Beals | ........................ | B60P 7/00 108/12 |
| 5,009,457 A * | 4/1991 | Hall | ........................ | B60P 7/02 224/486 |
| 5,110,021 A * | 5/1992 | Dawson, Jr. | ............. | B60J 7/141 224/405 |
| D332,438 S | 1/1993 | Krause | | |
| 5,398,985 A * | 3/1995 | Robinson | ................ | B60J 7/223 296/10 |
| 6,106,050 A * | 8/2000 | McLeod | ............ | B62D 33/0273 296/100.06 |
| 6,224,140 B1 * | 5/2001 | Hoplock | ................... | B60J 7/10 296/100.01 |
| 6,254,169 B1 * | 7/2001 | Arthur | ................... | B60J 7/1621 296/100.04 |
| 6,340,195 B1 * | 1/2002 | Hall | ....................... | B60J 7/1621 296/100.07 |
| 6,598,930 B1 | 7/2003 | Tilton | | |
| 6,607,229 B1 * | 8/2003 | McIntosh | ............... | B60J 7/1621 296/100.07 |
| 6,799,784 B2 * | 10/2004 | Rios | ........................ | B60J 7/141 296/100.07 |
| 7,243,965 B2 * | 7/2007 | King | ...................... | B60J 7/1614 296/164 |

(Continued)

*Primary Examiner* — Gregory Blankenship

(57) ABSTRACT

A convertible sidewall extender to truck bed cover assembly includes a pair of panels that each has an outside edge. Each outside edge is hingedly coupled to a respective side rail of a truck bed. Each of a plurality of doors is hingedly coupled to a respective panel, such that the door is positioned to cover a respective opening in the respective panel. The doors are configured to allow access to the truck bed. Each of a plurality of support rods is positionable between the pair of panels proximate to inside edges of the pair of panels. The support rods are positionable to support the pair of panels in an open configuration where the pair of panels is in substantial parallelism with the side rails of the truck bed.

19 Claims, 6 Drawing Sheets

(56) References Cited

U.S. PATENT DOCUMENTS

| | | | | |
|---|---|---|---|---|
| 7,246,839 B1* | 7/2007 | Nyberg | ............... | B60J 7/11 |
| | | | | 296/100.01 |
| 7,530,621 B1* | 5/2009 | Curts | ............... | B60J 7/141 |
| | | | | 296/100.1 |
| 7,946,643 B2* | 5/2011 | Getschel | ............... | B60J 7/1621 |
| | | | | 296/100.1 |
| 8,678,459 B1* | 3/2014 | Win | ............... | B60P 3/40 |
| | | | | 224/402 |
| 8,794,690 B1* | 8/2014 | Al-Saeed | ............... | B60J 7/1621 |
| | | | | 296/100.06 |
| 9,393,855 B2* | 7/2016 | Rohr | ............... | B60J 7/1621 |
| 2002/0149219 A1* | 10/2002 | Rios | ............... | B60J 7/141 |
| | | | | 296/26.06 |
| 2003/0047958 A1* | 3/2003 | Yarbrough | ............... | B60J 7/1621 |
| | | | | 296/100.06 |
| 2003/0098590 A1 | 5/2003 | Chechuck | | |
| 2005/0029832 A1* | 2/2005 | Verduci | ............... | B60J 7/19 |
| | | | | 296/100.06 |
| 2006/0119124 A1* | 6/2006 | Briggs | ............... | B60J 7/1614 |
| | | | | 296/26.06 |
| 2008/0129067 A1* | 6/2008 | Rios | ............... | B60J 7/141 |
| | | | | 296/3 |
| 2009/0230718 A1* | 9/2009 | Getschel | ............... | B60J 7/1621 |
| | | | | 296/100.1 |
| 2014/0252794 A1* | 9/2014 | Aho | ............... | B60J 7/141 |
| | | | | 296/100.09 |
| 2015/0197141 A1* | 7/2015 | Cortez | ............... | B60J 7/141 |
| | | | | 296/3 |
| 2015/0232133 A1* | 8/2015 | Miller | ............... | B62D 33/03 |
| | | | | 296/26.05 |
| 2016/0039275 A1* | 2/2016 | Rohr | ............... | B60J 7/1621 |
| | | | | 296/100.06 |

\* cited by examiner

CONVERTIBLE SIDEWALL EXTENDER TO TRUCK BED COVER ASSEMBLY

BACKGROUND OF THE DISCLOSURE

Field of the Disclosure

The disclosure relates to truck bed cover assemblies and more particularly pertains to a new truck bed cover assembly that converts to a sidewall extender.

SUMMARY OF THE DISCLOSURE

An embodiment of the disclosure meets the needs presented above by generally comprising a pair of panels that each has an outside edge. Each outside edge is hingedly coupled to a respective side rail of a truck bed. Each of a plurality of doors is hingedly coupled to a respective panel, such that the door is positioned to cover a respective opening in the respective panel. The doors are configured to allow access to the truck bed. Each of a plurality of support rods is positionable between the pair of panels proximate to inside edges of the pair of panels. The support rods are positionable to support the pair of panels in an open configuration where the pair of panels is in substantial parallelism with the side rails of the truck bed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
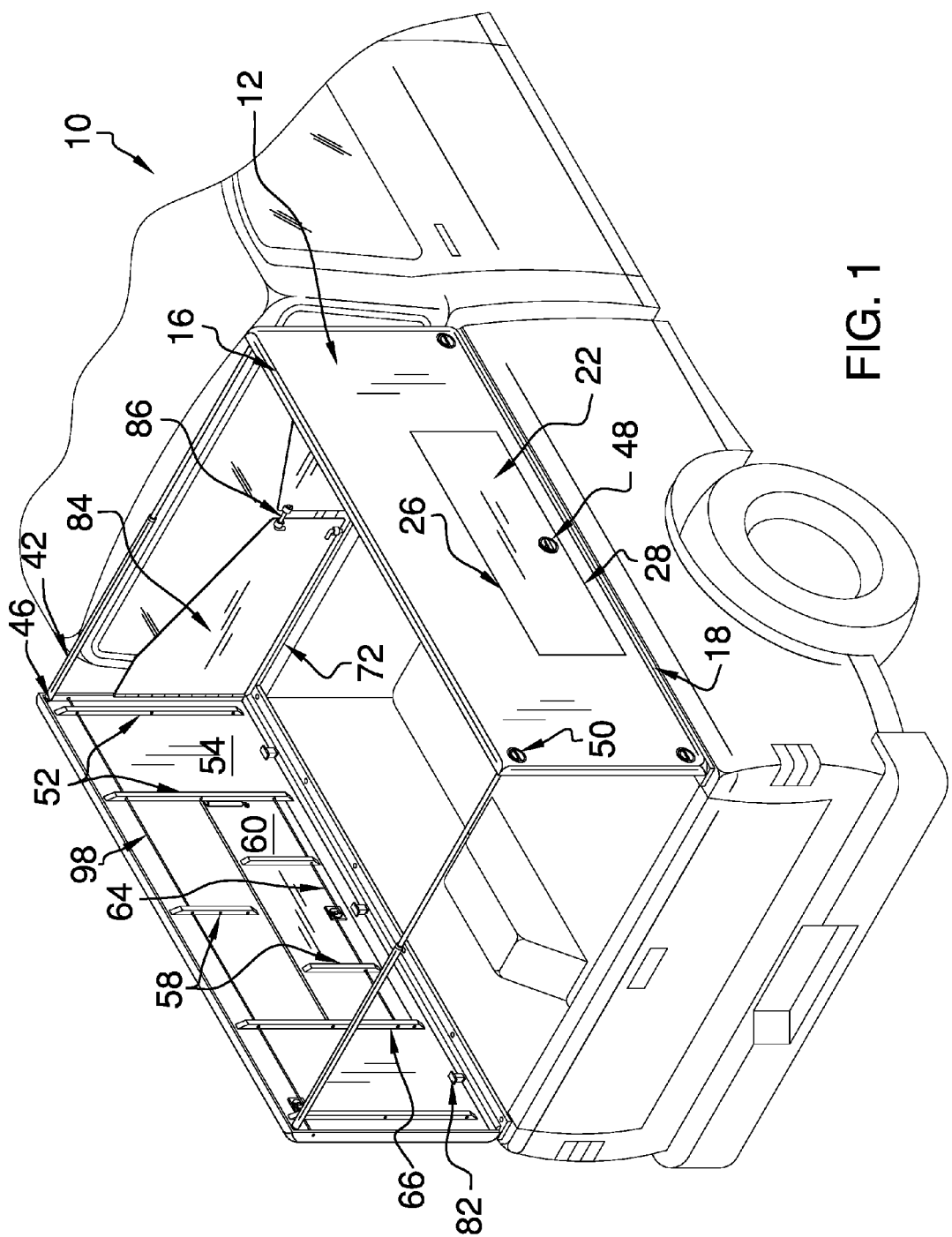
FIG. 1 is an isometric perspective view of a convertible sidewall extender to truck bed cover assembly according to an embodiment of the disclosure.
Figure 2:
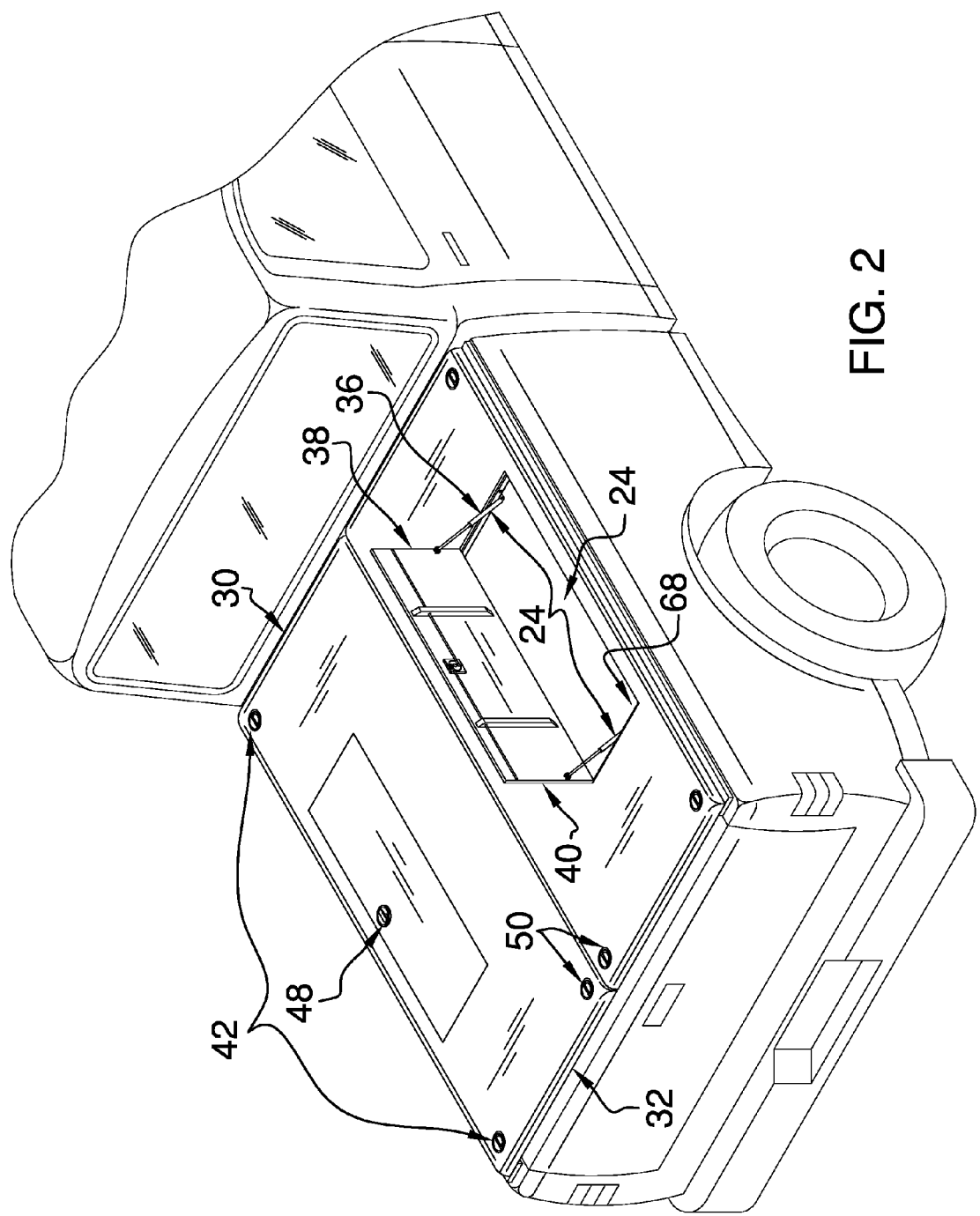
FIG. 2 is an isometric perspective view of an embodiment of the disclosure.
Figure 3:
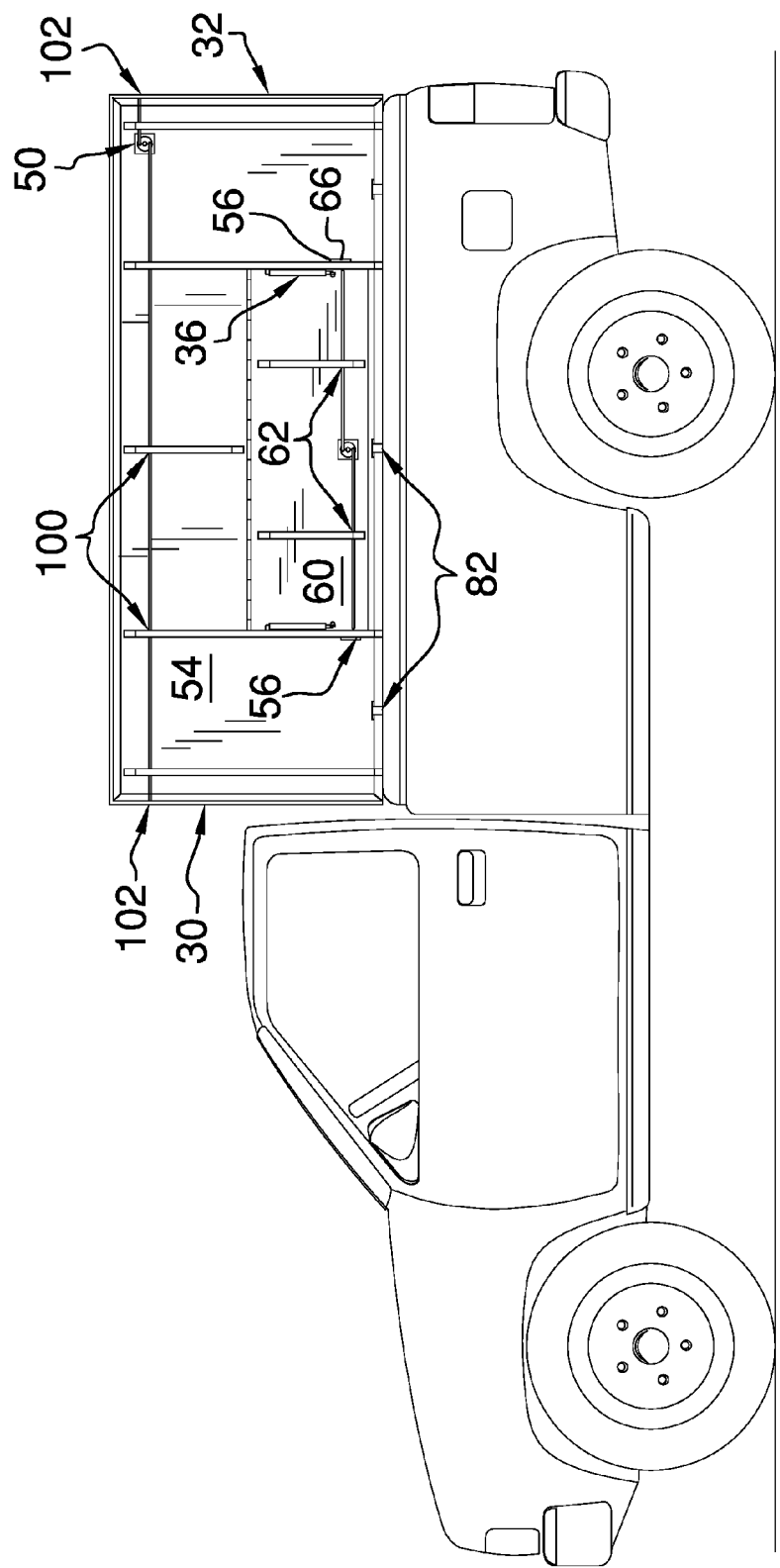
FIG. 3 is a side view of an embodiment of the disclosure.
Figure 4:
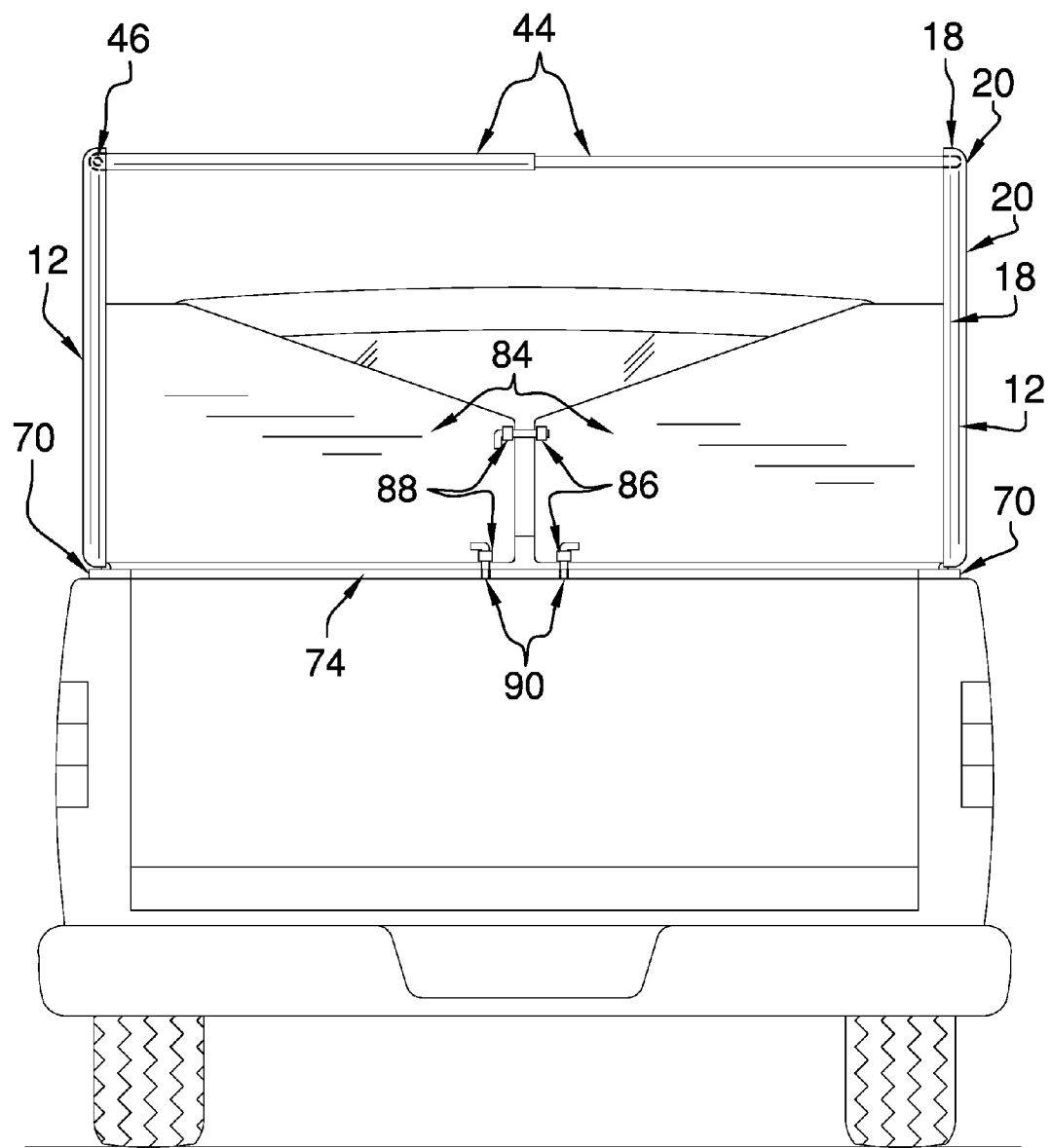
FIG. 4 is a rear view of an embodiment of the disclosure.
Figure 5:
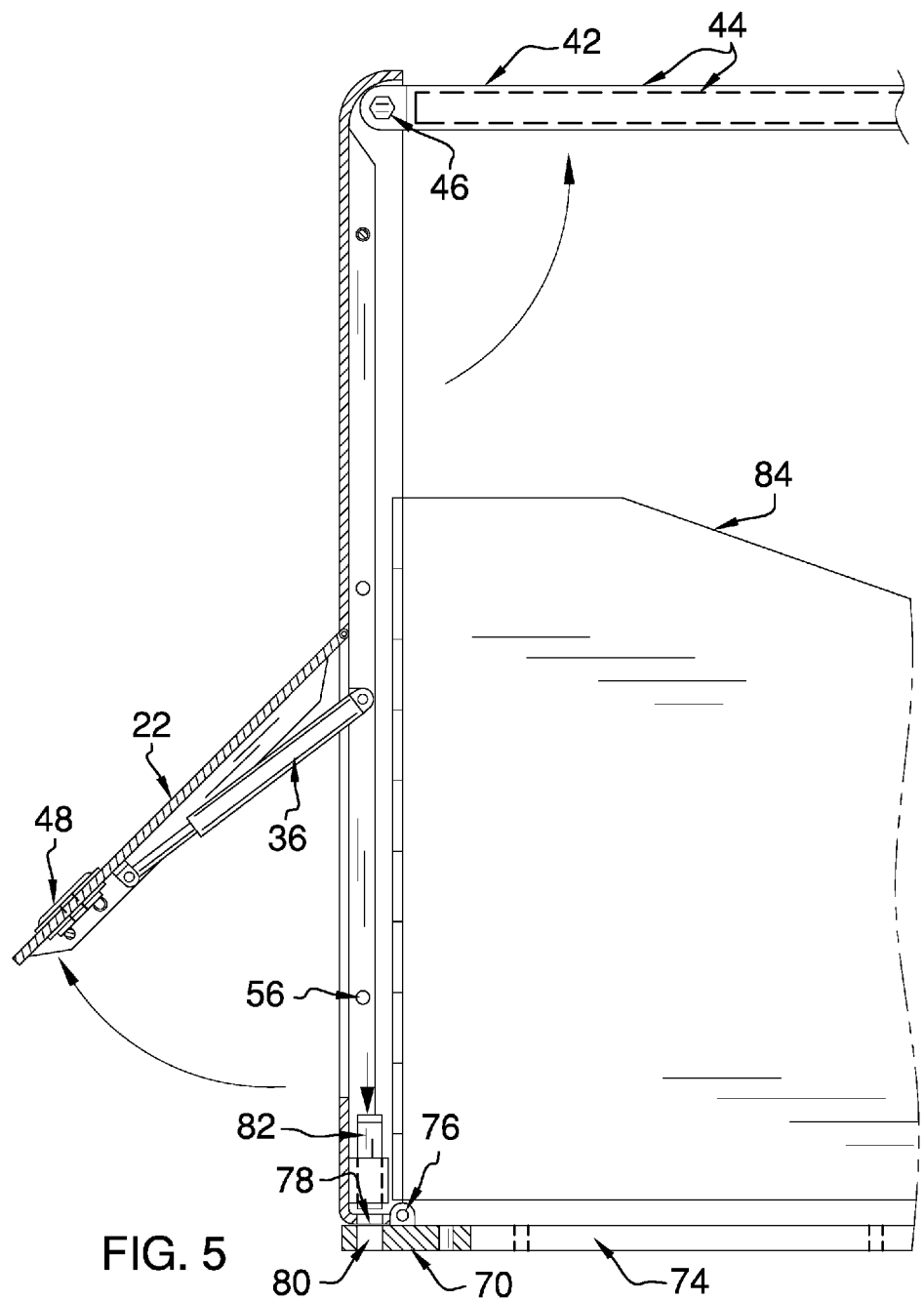
FIG. 5 is a cross-sectional view of an embodiment of the disclosure.
Figure 6:
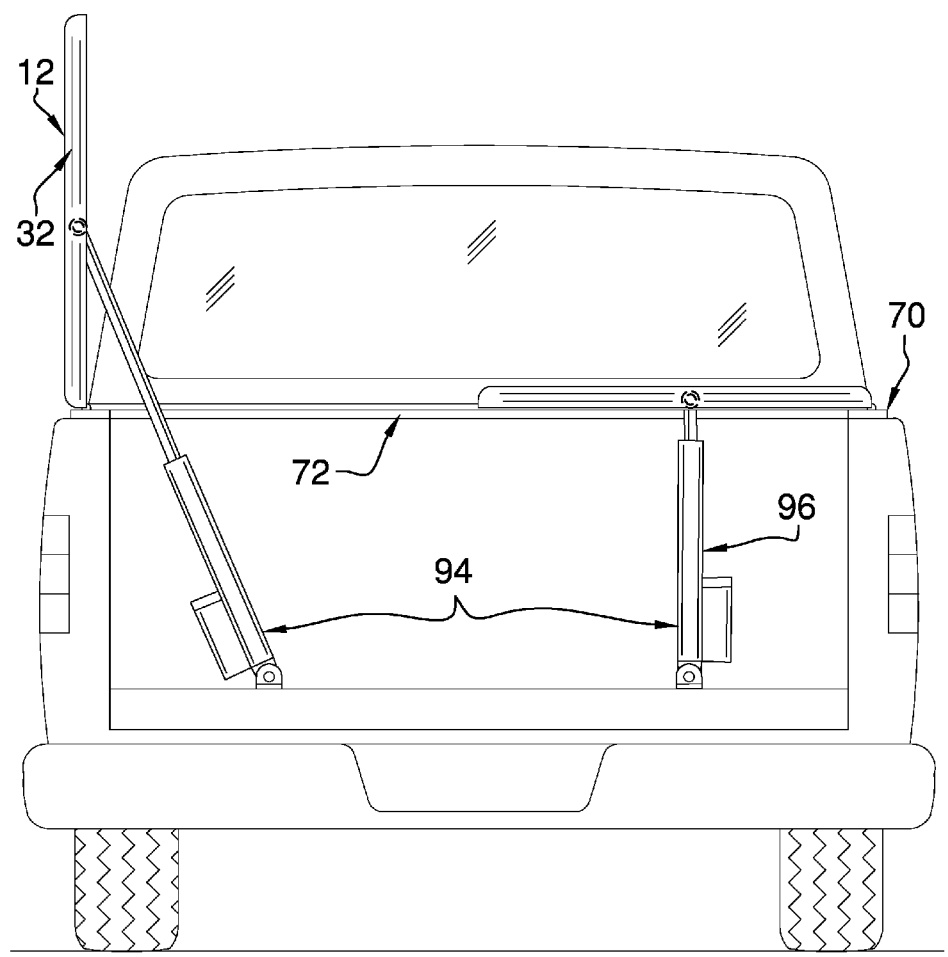
FIG. 6 is a rear view of an embodiment of the disclosure.

With reference now to the drawings, and in particular to FIGS. 1 through 6 thereof, a new truck bed cover assembly embodying the principles and concepts of an embodiment of the disclosure and generally designated by the reference numeral 10 will be described.

As best illustrated in FIGS. 1 through 6, the convertible sidewall extender to truck bed cover assembly 10 generally comprises a pair of panels 12 that each have an outside edge 14 and an inside edge 16. Each outside edge 14 is hingedly coupled to a respective side rail of the truck bed. The pair of panels 12 is rigid and rectangularly shaped. The pair of panels 12 is sized to cover a truck bed. Preferably, each panel 12 has a lip 18 that extends transversely from a rim 20 of panel 12.

Each of a plurality of doors 22 is hingedly coupled to a respective panel 12. Each door 22 is positioned to cover a respective opening 24 in the respective panel 12. The doors 22 are configured to allow access to the truck bed. Preferably, the doors 22 are substantially rectangularly shaped. Each door 22 has a top edge 26 and a bottom edge 28. The top edge 26 is hingedly coupled to the respective panel 12. The bottom edge 28 is positionable proximate to the outside edge 14 of the respective panel 12. Preferably, the plurality of doors 22 comprises two doors 22 positioned singly in each of the pair of panels 12 substantially equally distant from a front end 30 and a back end 32 of the respective panel 12.

Each of a plurality of openers 34 is coupled a respective door 22 and a respective panel 12 proximate to a respective opening 24. Each opener 34 is positioned to motivate the respective door 22 from a closed position to an open position. Preferably, the openers 34 comprise pistons 36. Also preferably, the plurality of openers 34 comprises openers 34 positioned singly proximate to front edges 38 and back edges 40 of the doors 22.

Each of a plurality of support rods 42 is positionable between the pair of panels 12 proximate the inside edges 16 of the pair of panels 12. The support rods 42 are positionable to support the pair of panels 12 in an open configuration in which the pair of panels 12 is in substantial parallelism with the side rails of the truck bed. Preferably, each support rod 42 comprises a plurality of nested sections 44, such that the support rods 42 are extendable. More preferably, each plurality of nested sections 44 comprises two nested sections 44. Each support rod 42 has a first terminus 46 that is pivotally coupled to a respective panel 12. The support rod 42 is foldable to substantial parallelism with the respective panel 12 when the nested sections 44 are in a nested configuration. The support rods 42 are substantially circular when viewed longitudinally. Preferably, the plurality of support rods 42 comprises a support rod 42 positionable between the pair of panels 12 proximate to the front ends 30 and a support rod 42 positionable between the pair of panels 12 proximate to the back ends 32.

Each of a plurality of first handles 48 is coupled to a respective door 22. The first handle 48 is positioned to facilitate operation of the respective door 22. Preferably, each first handle 48 is coupled to a respective door 22 proximate to the bottom edge 28 of the respective door 22. Also preferably, the first handles 48 are keyed, such that the first handles 48 are lockable.

Each of a pair of second handles 50 is coupled to a respective panel 12, such that the second handle 50 is positioned to facilitate operation of the respective panel 12. Preferably, each second handle 50 is coupled to a respective panel 12 proximate to the inside edge 16 and the back end 32 of the respective panel 12. Also preferably, the second handles 50 are keyed, such that the second handles 50 are lockable.

Each of a plurality of long ribs 52 is coupled to an inside face 54 of a respective panel 12 and extends from proximate to the inside edge 16 to proximate to the outside edge 14. Preferably, the plurality of long ribs 52 comprises long ribs 52 positioned singly proximate to each front end 30 and each back end 32 of the pair of panels 12. The plurality of long ribs 52 also comprises long ribs 52 positioned singly proximate to each front edge 38 and each back edge 40 of doors 22. Each of a plurality of lock holes 56 is positioned through a respective long rib 52.

The assembly 10 also comprises a plurality of short ribs 58. The short ribs 58 are coupled in pairs to an interior face 60 of a respective door 22. The short ribs 58 extend from proximate to the top edge 26 to proximate to the bottom edge 28 of the respective door 22. One short rib 58 is positioned substantially equally distant from a respective first handle 48 and the back edge 40 of the respective door 22, and one short rib 58 is positioned substantially equally distant from the respective first handle 48 and the front edge 38 of the respective door 22. Additional short ribs 58 are coupled singly to the inside face 54 of a respective panel 12 and extend from proximate to the top edge 26 of respective door 22 to proximate to a respective inside edge 16 of panel 12. The short rib 58 is in substantial alignment with the handle of the respective door 22. Each of a plurality of first guide holes 62 is positioned in a respective short rib 58. The first guide holes 62 are in horizontal alignment with respective lock holes 56 positioned in respective long ribs 52.

Each first handle 48 is rotatable and coupled to a pair of first lock bars 64. The first lock bars 64 are complementary to the lock holes 56 and first guide holes 62. The first lock bars 64 are positioned through respective first guide holes 62 positioned in respective short ribs 58. Each of the pair of first lock bars 64 is compellable laterally upon rotation of the first handle 48. An engaging end 66 of the first lock bar 64 is positionable through a respective lock hole 56 that is positioned through a respective long rib 52, which is positioned proximate to a respective opposing edge 68 of a respective opening 24.

Each of a pair of side mounting plates 70 is complementary to and coupled to a respective side rail of the truck bed. A front mounting plate 72 is complementary to and coupled to a top of the front wall of the truck bed. The front mounting plate 72 extends between the pair of side mounting plates 70. A rear mounting plate 74 is complementary to and coupled to a top of a tailgate of the truck bed.

Each second handle 50 is rotatable and coupled to a respective one of a pair of second lock bars 98. The second lock bars 98 are complementary to second guide holes 100 positioned in horizontal alignment through the long ribs 52. The second lock bars 98 are positioned through respective second guide holes 100 positioned in respective long ribs 52. Each of the pair of second lock bars 98 is compellable laterally upon rotation of the second handle 50. Opposing ends 102 of the second lock bar 98 are configured to be positioned below the front mounting plate 72 and the rear mounting plate 74 to secure the pair of panels 12 in a closed configuration.

Each of a pair of hinges 76 is coupled to a respective side mounting plate 70 and a respective panel 12, such that the respective panel 12 is hingedly coupled to the side rail of the truck bed. Each of a plurality of first penetrations 78 is positioned through a respective side mounting plate 70. Each of a plurality of second penetrations 80, which is complementary to the first penetrations 78, is positioned through the lip 18 of a respective panel 12. Each second penetration 80 is in alignment with a respective first penetration 78 when the respective panel 12 is in the open configuration.

Each of a plurality of pegs 82, which is complementary to the first penetrations 78 and the second penetrations 80, is positionable through the respective second penetration 80 and the respective first penetration 78 to retain the respective panel 12 in the open configuration.

Each of a set of four support panels 84 is singly and hingedly coupled to the pair of panels 12 proximate to each front end 30 and each back end 32. The support panels 84 are positionable to extend between the pair of panels 12 when the pair of panels 12 is in an open configuration. Each of a plurality of pins 86 is complementary to rings 88 coupled to the support panels 84. Respective pins 86 are positioned for insertion through respective rings 88, which are positioned horizontally on the support panels 84, into respective pin holes 90 to secure the support panels 84 in an extended position between the pair of panels 12. The respective pin holes 90 are positioned in the front mounting plate 72 and the rear mounting plate 74. Respective pins 86 also are positioned for insertion through respective rings 88 positioned vertically on the support panels 84 to couple the support panels 84 together.

Each of a plurality of couplers 92 is configured for coupling to tie downs. Preferably, the plurality of couplers 92 comprises couplers 92 positioned proximate to the outside edges 14 of the pair of panels 12 proximate to the front ends 30, and couplers 92 positioned proximate to the outside edges 14 of the pair of panels 12 proximate to the back ends 32.

Each of a plurality of actuators 94 is coupled to and extends between a respective panel 12 and the bed of the truck. The actuator 94 is positioned to motivate the respective panel 12 from a closed position to an open position. Preferably, the actuators 94 comprise electric lift linear actuators 96 and the plurality of actuators 94 comprises actuators 94 positioned singly proximate to the back end 32 of each panel 12.

In use, the pair of panels 12 is configured to cover the bed of the truck when in a closed configuration, and to extend the side rails of the bed of the truck when in an open configuration. The support rods 42 are positionable to support the panels 12 in the open configuration. The support panels 84 are positionable between the panels 12 and securable to the front mounting plate 72 and the rear mounting plate 74 using the pins 86. The doors 22 are positioned in the panels 12 to allow a user access to the truck bed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A convertible sidewall extender to truck bed cover assembly comprising:
   a pair of panels, each said panel having an outside edge, said outside edge being hingedly coupled to a respective side rail of the truck bed;
   a plurality of doors, each said door being hingedly coupled to a respective said panel, wherein said door is positioned to cover a respective opening in said respective said panel, such that said doors are configured to allow access to the truck bed;
   a plurality of support rods, each said support rod being positionable between said pair of panels proximate to inside edges of said pair of panels, wherein said support rods are positionable to support said pair of panels in an open configuration wherein said pair of panels are in substantial parallelism with the side rails of the truck bed;
   said doors being substantially rectangularly shaped;
   each said door having a top edge and a bottom edge;
   said top edge being hingedly coupled to said respective said panel; and
   said bottom edge being positionable proximate to said outside edge of said respective said panel.

2. The assembly of claim 1, further comprising:
   said pair of panels being rigid and rectangularly shaped;
   said pair of panels being sized to cover a truck bed; and
   each said panel having a lip extending transversely from a rim of said panel.

3. The assembly of claim 1, further including said plurality of doors comprising two doors positioned singly in each of said pair of panels substantially equally distant from a front end and a back end of said respective said panel.

4. The assembly of claim 1, further including a plurality of openers, each said opener being coupled a respective said door and a respective said panel proximate to a respective said respective opening, wherein each said opener is positioned to motivate said respective said door from a closed position to an open position.

5. The assembly of claim 4, further including said openers comprising pistons.

6. The assembly of claim 4, further including said plurality of openers comprising openers positioned singly proximate to front edges and back edges of said doors.

7. The assembly of claim 3, further including each said support rod comprising a plurality of nested sections, such that said support rods are extendable, each said plurality of nested sections comprising two nested sections.

8. The assembly of claim 7, further including each said support rod having a first terminus, said first terminus being pivotally coupled to a respective said panel such that said support rod is foldable to substantial parallelism with said respective said panel when said nested sections are in a nested configuration, said support rods being substantially circular when viewed longitudinally, said plurality of support rods comprising a support rod positionable between said pair of panels proximate to said front ends and a support rod positionable between said pair of panels proximate to said back ends.

9. The assembly of claim 3, further including a plurality of couplers, said couplers being configured for coupling to tie downs, said plurality of couplers comprising couplers positioned proximate to said outside edges of said pair of panels proximate to said front ends and couplers positioned proximate to said outside edges of said pair of panels proximate to said back ends.

10. The assembly of claim 1, further including a plurality of actuators, each said actuator being coupled to and extending between a respective said panel and the bed of the truck, wherein said actuator is positioned to motivate said respective said panel from a closed position to an open position.

11. The assembly of claim 10, further including said actuators comprising electric lift linear actuators.

12. The assembly of claim 10, further including said plurality of actuators comprising actuators positioned singly proximate to said back of each said panel.

13. A convertible sidewall extender to truck bed cover assembly comprising:
   a pair of panels, each said panel having an outside edge, said outside edge being hingedly coupled to a respective side rail of the truck bed;
   a plurality of doors, each said door being hingedly coupled to a respective said panel, wherein said door is positioned to cover a respective opening in said respective said panel, such that said doors are configured to allow access to the truck bed;
   a plurality of support rods, each said support rod being positionable between said pair of panels proximate to inside edges of said pair of panels, wherein said support rods are positionable to support said pair of panels in an open configuration wherein said pair of panels are in substantial parallelism with the side rails of the truck bed;
   a plurality of first handles, each said first handle being coupled to a respective said door, such that said first handle is positioned to facilitate operation of said respective said door, each said first handle being coupled to a respective said door proximate to a bottom edge of said respective said door; and
   a pair of second handles, each said second handle being coupled to a respective said panel, such that said second handle is positioned to facilitate operation of said respective said panel, each said second handle being coupled to a respective said panel proximate to said inside edge and said back end of said respective said panel.

14. The assembly of claim 13, further comprising:
   said first handles being keyed, such that said first handles are lockable; and
   said second handles being keyed, such that said second handles are lockable.

15. The assembly of claim 13, further comprising:
   a plurality of long ribs, each said long rib being coupled to an inside face of a respective said panel and extending from proximate to said inside edge to proximate to said outside edge;
   a plurality of lock holes, each said lock hole being positioned through a respective said long rib;
   a plurality of short ribs, said short ribs being coupled in pairs to an interior face of a respective said door, said short ribs extending from proximate to said top edge to proximate to said bottom edge of said respective said door, such that one said short rib is positioned substantially equally distant from a respective said first handle and said back edge of said respective said door and one short rib is positioned substantially equally distant from said respective said first handle and said front edge of said respective said door, said short ribs being coupled singly to said inside face of a respective said panel and extending from proximate to said top edge of respective said door to proximate to a respective said inside edge of said panel, such that said short rib is in substantial alignment with said handle of said respective said door;

a plurality of first guide holes, each said guide hole being positioned in a respective said short rib, such that said first guide holes are in horizontal alignment with respective said lock holes positioned in respective said long ribs; and each said first handle being rotatable, each said first handle being coupled to a pair of first lock bars, said first lock bars being complementary to said lock holes and said first guide holes, said first lock bars being positioned through respective said first guide holes positioned in respective said short ribs, wherein each of said pair of first lock bars is compellable laterally upon rotation of said first handle, such that an engaging end of said first lock bar is positionable through a respective said lock hole positioned through a respective said long rib positioned proximate to a respective opposing edge of a respective said opening.

16. The assembly of claim 15, further including said plurality of long ribs comprising long ribs positioned singly proximate to each said front end and each said back end of said pair of panels, said plurality of long ribs comprising long ribs positioned singly proximate to each said front edge and each said back edge of said doors.

17. The assembly of claim 15, further comprising:
a pair of side mounting plates, each said side mounting plate being complementary to and coupled to a respective side rail of the truck bed;
a front mounting plate, said front mounting plate being complementary to and coupled to a top of the front wall of the truck bed, said front mounting plate extending between said pair of side mounting plates;
a rear mounting plate, said rear mounting plate being complementary to and coupled to a top of a tailgate of the truck bed;
a pair of hinges, each said hinge being coupled to a respective said side mounting plate and a respective said panel, such that said respective said panel is hingedly coupled to the side rail of the truck bed;
a plurality of first penetrations, each said first penetration being positioned through a respective said side mounting plate;
a plurality of second penetrations, said second penetrations being complementary to said first penetrations, each said second penetration being positioned through said lip of a respective said panel, such that each said second penetration is in alignment with a respective said first penetration when said respective said panel is in the open configuration;
a plurality of pegs, said pegs being complementary to said first penetrations and said second penetrations, wherein each said peg is positionable through a respective said second penetration and said respective said first penetration to retain said respective said panel in the open configuration; and
each said second handle being rotatable, each said second handle being coupled to a respective one of a pair of second lock bars, said second lock bars being complementary to second guide holes positioned in horizontal alignment through said long ribs, said second lock bars being positioned through respective said second guide holes positioned in respective long ribs, said second lock bars being compellable laterally upon rotation of said second handle, wherein opposing ends of said second lock bar are configured to be positioned below said front mounting plate and said rear mounting plate to secure said pair of panels in a closed configuration.

18. The assembly of claim 17, further comprising:
a set of four support panels, said support panels being singly and hingedly coupled to said pair of panels proximate to each said front end and each said back, wherein said support panels are positionable to extend between said pair of panels when said pair of panels is in an open configuration;
a plurality of pins, said pins being complementary to rings coupled to said support panels; and
wherein respective said pins are positioned for insertion through respective said rings positioned horizontally on said support panels into respective pin holes to secure said support panels in an extended position between said pair of panels, respective said pin holes being positioned in said front mounting plate and said rear mounting plate, wherein respective said pins are positioned for insertion through respective said rings positioned vertically on said support panels to couple said support panels together.

19. A convertible sidewall extender to truck bed cover assembly comprising:
a pair of panels, each said panel having an outside edge, said outside edge being hingedly coupled to a respective side rail of the truck bed, said pair of panels being rigid and rectangularly shaped, said pair of panels being sized to cover a truck bed, each said panel having a lip extending transversely from a rim of said panel;
a plurality of doors, each said door being hingedly coupled to a respective said panel, wherein said door is positioned to cover a respective opening in said respective said panel, such that said doors are configured to allow access to the truck bed, said doors being substantially rectangularly shaped, each said door having a top edge and a bottom edge, said top edge being hingedly coupled to said respective said panel, said bottom edge being positionable proximate to said outside edge of said respective said panel, said plurality of doors comprising two doors positioned singly in each of said pair of panels substantially equally distant from a front end and a back end of said respective said panel;
a plurality of openers, each said opener being coupled a respective said door and a respective said panel proximate to a respective said respective opening, wherein each said opener is positioned to motivate said respective said door from a closed position to an open position, said openers comprising pistons, said plurality of openers comprising openers positioned singly proximate to front edges and back edges of said doors;
a plurality of support rods, each said support rod being positionable between said pair of panels proximate to inside edges of said pair of panels, wherein said support rods are positionable to support said pair of panels in an open configuration wherein said pair of panels are in substantial parallelism with the side rails of the truck bed, each said support rod comprising a plurality of nested sections, such that said support rods are extendable, each said plurality of nested sections comprising two nested sections, each said support rod having a first terminus, said first terminus being pivotally coupled to a respective said panel such that said support rod is foldable to substantial parallelism with said respective said panel when said nested sections are in a nested configuration, said support rods being substantially circular when viewed longitudinally, said plurality of support rods comprising a support rod positionable between said pair of panels proximate to said front ends and a support rod positionable between said pair of panels proximate to said back ends;

a plurality of first handles, each said first handle being coupled to a respective said door, such that said first handle is positioned to facilitate operation of said respective said door, each said first handle being coupled to a respective said door proximate to a bottom edge of said respective said door, said first handles being keyed, such that said first handles are lockable;

a pair of second handles, each said second handle being coupled to a respective said panel, such that said second handle is positioned to facilitate operation of said respective said panel, each said second handle being coupled to a respective said panel proximate to said inside edge and said back end of said respective said panel, said second handles being keyed, such that said second handles are lockable;

a plurality of long ribs, each said long rib being coupled to an inside face of a respective said panel and extending from proximate to said inside edge to proximate to said outside edge, said plurality of long ribs comprising long ribs positioned singly proximate to each said front end and each said back end of said pair of panels, said plurality of long ribs comprising long ribs positioned singly proximate to each said front edge and each said back edge of said doors;

a plurality of lock holes, each said lock hole being positioned through a respective said long rib;

a plurality of short ribs, said short ribs being coupled in pairs to an interior face of a respective said door, said short ribs extending from proximate to said top edge to proximate to said bottom edge of said respective said door, such that one said short rib is positioned substantially equally distant from a respective said first handle and said back edge of said respective said door and one short rib is positioned substantially equally distant from said respective said first handle and said front edge of said respective said door, said short ribs being coupled singly to said inside face of a respective said panel and extending from proximate to said top edge of respective said door to proximate to a respective said inside edge of said panel, such that said short rib is in substantial alignment with said handle of said respective said door;

a plurality of first guide holes, each said guide hole being positioned in a respective said short rib, such that said first guide holes are in horizontal alignment with respective said lock holes positioned in respective said long ribs;

each said first handle being rotatable, each said first handle being coupled to a pair of first lock bars, said first lock bars being complementary to said lock holes and said first guide holes, said first lock bars being positioned through respective said first guide holes positioned in respective said short ribs, wherein each of said pair of first lock bars is compellable laterally upon rotation of said first handle, such that an engaging end of said first lock bar is positionable through a respective said lock hole positioned through a respective said long rib positioned proximate to a respective opposing edge of a respective said opening;

a pair of side mounting plates, each said side mounting plate being complementary to and coupled to a respective side rail of the truck bed;

a front mounting plate, said front mounting plate being complementary to and coupled to a top of the front wall of the truck bed, said front mounting plate extending between said pair of side mounting plates;

a rear mounting plate, said rear mounting plate being complementary to and coupled to a top of a tailgate of the truck bed;

a pair of hinges, each said hinge being coupled to a respective said side mounting plate and a respective said panel, such that said respective said panel is hingedly coupled to the side rail of the truck bed;

a plurality of first penetrations, each said first penetration being positioned through a respective said side mounting plate;

a plurality of second penetrations, said second penetrations being complementary to said first penetrations, each said second penetration being positioned through said lip of a respective said panel, such that each said second penetration is in alignment with a respective said first penetration when said respective said panel is in the open configuration;

each said second handle being rotatable, each said second handle being coupled to a respective one of a pair of second lock bars, said second lock bars being complementary to second guide holes positioned in horizontal alignment through said long ribs, said second lock bars being positioned through respective said second guide holes positioned in respective long ribs, said second lock bars being compellable laterally upon rotation of said second handle, wherein opposing ends of said second lock bar are configured to be positioned below said front mounting plate and said rear mounting plate to secure said pair of panels in a closed configuration;

a plurality of pegs, said pegs being complementary to said first penetrations and said second penetrations, wherein each said peg is positionable through a respective said second penetration and said respective said first penetration to retain said respective said panel in the open configuration;

a set of four support panels, said support panels being singly and hingedly coupled to said pair of panels proximate to each said front end and each said back end, wherein said support panels are positionable to extend between said pair of panels when said pair of panels is in an open configuration;

a plurality of pins, said pins being complementary to rings coupled to said support panels, wherein respective said pins are positioned for insertion through respective said rings positioned horizontally on said support panels into respective pin holes to secure said support panels in an extended position between said pair of panels, respective said pin holes being positioned in said front mounting plate and said rear mounting plate, wherein respective said pins are positioned for insertion through respective said rings positioned vertically on said support panels to couple said support panels together;

a plurality of couplers, said couplers being configured for coupling to tie downs, said plurality of couplers comprising couplers positioned proximate to said outside edges of said pair of panels proximate to said front ends and couplers positioned proximate to said outside edges of said pair of panels proximate to said back ends; and a plurality of actuators, each said actuator being coupled to and extending between a respective said panel and the bed of the truck, wherein said actuator is positioned to motivate said respective said panel from a closed position to an open position, said actuators comprising electric lift linear actuators, said plurality of actuators comprising actuators positioned singly proximate to said back end of each said panel.

\* \* \* \* \*